US009571601B2

(12) United States Patent
Dou

(10) Patent No.: US 9,571,601 B2
(45) Date of Patent: Feb. 14, 2017

(54) METHOD AND AN APPARATUS FOR PERFORMING OFFLINE ACCESS TO WEB PAGES

(71) Applicant: Tencent Technology (Shenzhen) Co., Ltd., Shenzhen, Guangdong (CN)

(72) Inventor: Ningjun Dou, Guangdong (CN)

(73) Assignee: TENCENT TECHNOLOGY (SHNZHEN) CO., LTD., Shenzhen (CN)

(*) Notice: Subject to any disclaimer, the term of this patent is extended or adjusted under 35 U.S.C. 154(b) by 340 days.

(21) Appl. No.: 14/281,293

(22) Filed: May 19, 2014

(65) Prior Publication Data

US 2014/0379839 A1    Dec. 25, 2014

Related U.S. Application Data

(63) Continuation of application No. PCT/CN2014/070987, filed on Jan. 21, 2014.

(30) Foreign Application Priority Data

May 23, 2013   (CN) .......................... 2013 1 0196199

(51) Int. Cl.
*H04L 29/08*     (2006.01)
*G06F 17/30*     (2006.01)

(52) U.S. Cl.
CPC ..... *H04L 67/2842* (2013.01); *G06F 17/30902* (2013.01)

(58) Field of Classification Search
CPC .. H04L 67/02; H04L 67/2842; G06F 17/3089; G06F 17/30905

(Continued)

(56) References Cited

U.S. PATENT DOCUMENTS

2003/0009563 A1*  1/2003  Douglis ............ G06F 17/30893
                                                         709/227
2003/0163517 A1*  8/2003  Assaf .................... H04W 28/06
                                                         709/203

(Continued)

FOREIGN PATENT DOCUMENTS

CN        101288268 A      10/2008
WO    WO2009004513 A1       8/2009

OTHER PUBLICATIONS

International Preliminary Report on Patentability and Written Opinion received in PCT Application No. PCT/CN2014/070987 dated Nov. 24, 2015.

(Continued)

*Primary Examiner* — Ruolei Zong
(74) *Attorney, Agent, or Firm* — Brinks Gilson & Lione

(57) ABSTRACT

The embodiments disclose a method and apparatus for offline access of web pages. The method includes: acquiring on a user terminal a local cache template of a first web page, wherein the local cache template has pre-stored one or more respective paths, each points to a respective designated Uniform Resource Locator (URL) location linked to the first web page, wherein each respective designated URL enables offline access to a corresponding second web page in the first web page; locally caching each of the corresponding second web page, wherein each of the corresponding second web page which corresponds to a respective path pointing to the respective designated URL pre-stored in the local cache template of the first web page, such that the corresponding second web page is to be locally loaded into a browser of the user terminal when the browser accesses the respective designated URL in the first web page.

15 Claims, 4 Drawing Sheets

(58) Field of Classification Search
USPC .......................................... 709/213, 217–219
See application file for complete search history.

(56) References Cited

U.S. PATENT DOCUMENTS

| | | | |
|---|---|---|---|
| 2009/0006308 A1* | 1/2009 | Fonsen | G06F 17/30902 |
| 2009/0132556 A1* | 5/2009 | Gupta | G06F 8/65 |
| 2009/0235187 A1* | 9/2009 | Kim | G06F 17/30905 |
| | | | 715/760 |
| 2013/0067170 A1* | 3/2013 | Lam | G06F 17/30902 |
| | | | 711/137 |

OTHER PUBLICATIONS

International Search Report received in PCT Application No. PCT/CN2014/070987 dated Mar. 27, 2014.

* cited by examiner

METHOD AND AN APPARATUS FOR PERFORMING OFFLINE ACCESS TO WEB PAGES

CROSS-REFERENCE TO RELATED APPLICATIONS

The application is a continuation of PCT Application No. PCT/CN2014/070987, filed on Jan. 21, 2014, which claims priority to Chinese Patent Application No. 2013101961995, filed on May 23, 2013, which is incorporated by reference in its entireties.

FIELD OF THE TECHNOLOGY

The present disclosure relates to the technical field of the Internet, and particularly to a method, and a device for performing offline access to web pages.

BACKGROUND

With the wide application of mobile internet, mobile terminals may access the internet at anytime and anywhere through a browser installed in mobile terminals for web page access to obtain various information and resources. Mobile terminals may connect to the web through Wireless Fidelity (Wi-Fi), General Packet Radio Service (GPRS) and Wideband Code Division Multiple Access (WCDMA) services, which result in expenses for consumed network traffic.

Current browsers offer offline access to a current web page by locally caching the web page (i.e., first web page) in the browser for later offline access after the Wi-Fi connection has been removed. Current browsers, however, does not support direct offline access to the various links of interests which open up the corresponding web pages (i.e., second web pages) of interest linked to the current web page. Instead, a user would have to open each link of interest to locally cache the corresponding web page. In effect, the viewing of each corresponding web page (i.e., second web page) of interest will be treated as a separate offline web page access event, just like the offline access to the current web page (i.e., first web page). Such additional operational processes are therefore both tedious and cumbersome to the user's experience.

SUMMARY

The embodiments of the present disclosure disclose a method and apparatus for offline access of web pages, which may improve operational efficiency and improve user's experience. The method includes: acquiring on a user terminal a local cache template of a first web page, wherein the local cache template has pre-stored one or more respective paths, each points to a respective designated Uniform Resource Locator (URL) location in the first web page, wherein each respective designated URL enables offline access to a corresponding second web page linked to the first web page; locally caching each of the corresponding second web page, wherein each of the corresponding second web page which corresponds to a respective path pointing to the respective designated URL pre-stored in the local cache template of the first web page, such that the corresponding second web page is to be locally loaded into a browser of the user terminal when the browser accesses the respective designated URL in the first web page.

In another aspect, the embodiments of the present disclosure disclose an offline web page accessing apparatus, which includes at least a processor operating in conjunction with at least a memory which stores instruction codes operable as plurality of units, wherein the plurality of units include: an acquisition unit, which acquires a local cache template of a first web page, wherein the local cache template has pre-stored one or more respective paths, each points to a respective designated Uniform Resource Locator (URL) location in the first web page, wherein each respective designated URL enables offline access to a corresponding second web page linked to the first web page; locally caching each of the corresponding second web page, wherein each of the corresponding second web page which corresponds to a respective path pointing to the respective designated URL pre-stored in the local cache template of the first web page, such that the corresponding second web page is to be locally loaded into a browser of the user terminal when the browser accesses the respective designated URL in the first web page.

In another aspect, the embodiments of the present disclosure disclose a non-transitory computer-readable medium having stored thereon, a computer program having at least one code section being executable by a user terminal which causes the mobile terminal to perform steps for offline access to a web page by a browser. The steps include: acquiring on a user terminal a local cache template of a first web page, wherein the local cache template has pre-stored one or more respective paths, each points to a respective designated Uniform Resource Locator (URL) location in the first web page, wherein each respective designated URL enables offline access to a corresponding second web page linked to the first web page; locally caching each of the corresponding second web page, wherein each of the corresponding second web page which corresponds to a respective path pointing to the respective designated URL pre-stored in the local cache template of the first web page, such that the corresponding second web page is to be locally loaded into a browser of the user terminal when the browser accesses the respective designated URL in the first web page.

The present disclosure implements caching of pre-stored respective paths, each points to a respective designated Uniform Resource Locator (URL) location in the first web page, wherein each respective designated URL enables offline access to a corresponding second web page in the first web page, such that the corresponding second web page is to be locally loaded into a browser of the user terminal when the browser accesses the respective designated URL in the first web page.

In effect, the method of the present disclosure enables a user to directly access a corresponding second web page by clicking on a respective link (i.e., respective designated URL) in the current web page (i.e., the first web page). The method of the present disclosure therefore eliminates the extra steps of performing separate offline access operations for each web page corresponding to the respective links, thus simplifies offline second web page access operations and improves user's experience.

BRIEF DESCRIPTION OF THE DRAWINGS

The accompanying drawings are included to provide a further understanding of the claims and disclosure, are incorporated in, and constitute a part of this specification. The detailed description and illustrated embodiments described serve to explain the principles defined by the claims and may not be construed in a limited sense.

DETAILED DESCRIPTION OF THE EMBODIMENTS

The various embodiments of the present disclosure are further described in details in combination with attached drawings and embodiments below. It should be understood that the specific embodiments described here are used only to explain the present disclosure, and are not used to limit the present disclosure. In addition, for the sake of keeping description brief and concise, the newly added features, or features that are different from those previously described in each new embodiment will be described in details. Similar features may be referenced back to the prior descriptions. Alternately, features in higher numbered drawings may be referenced to in order to provide further details to the description in the currently described drawing. It should be understood that the embodiments described herein are merely examples to illustrate the present disclosure without limitations to their scope.

The embodiments of the present disclosure illustrate how to perform local caching of a web page as well as local caching of the links contained in the web page, so that when the browser accesses the web page offline, the web pages associated with the links may be directly accessed offline through the links as well. The embodiments of the present disclosure simplify the process for web page offline access and improve operations efficiency.

In an embodiment of the present disclosure, a browser running on a mobile terminal such as a personal computer (PC), a smart phone, a tablet, a personal digital assistant (PDAs) or any terminal which may access a network may perform online access of web pages.

Figure 1:
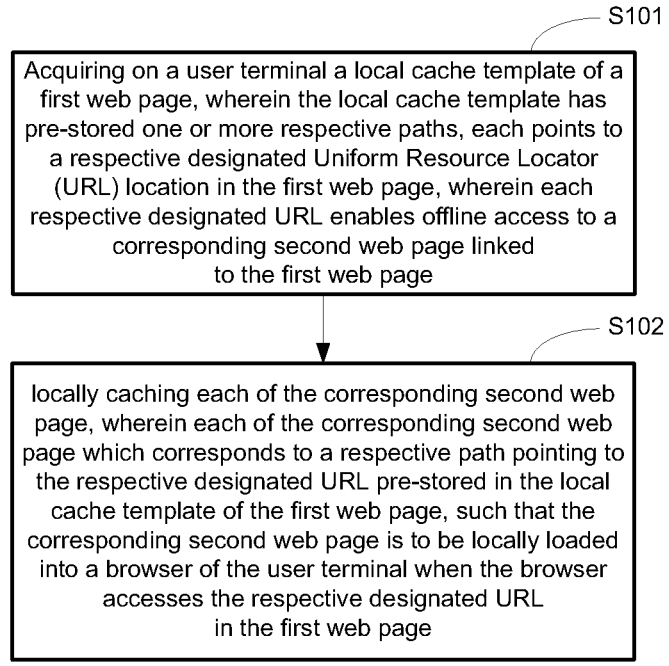
FIG. 1 is an exemplary flow diagram illustrating a method for offline access of web pages, according to an embodiment of the present disclosure.
Figure 6:
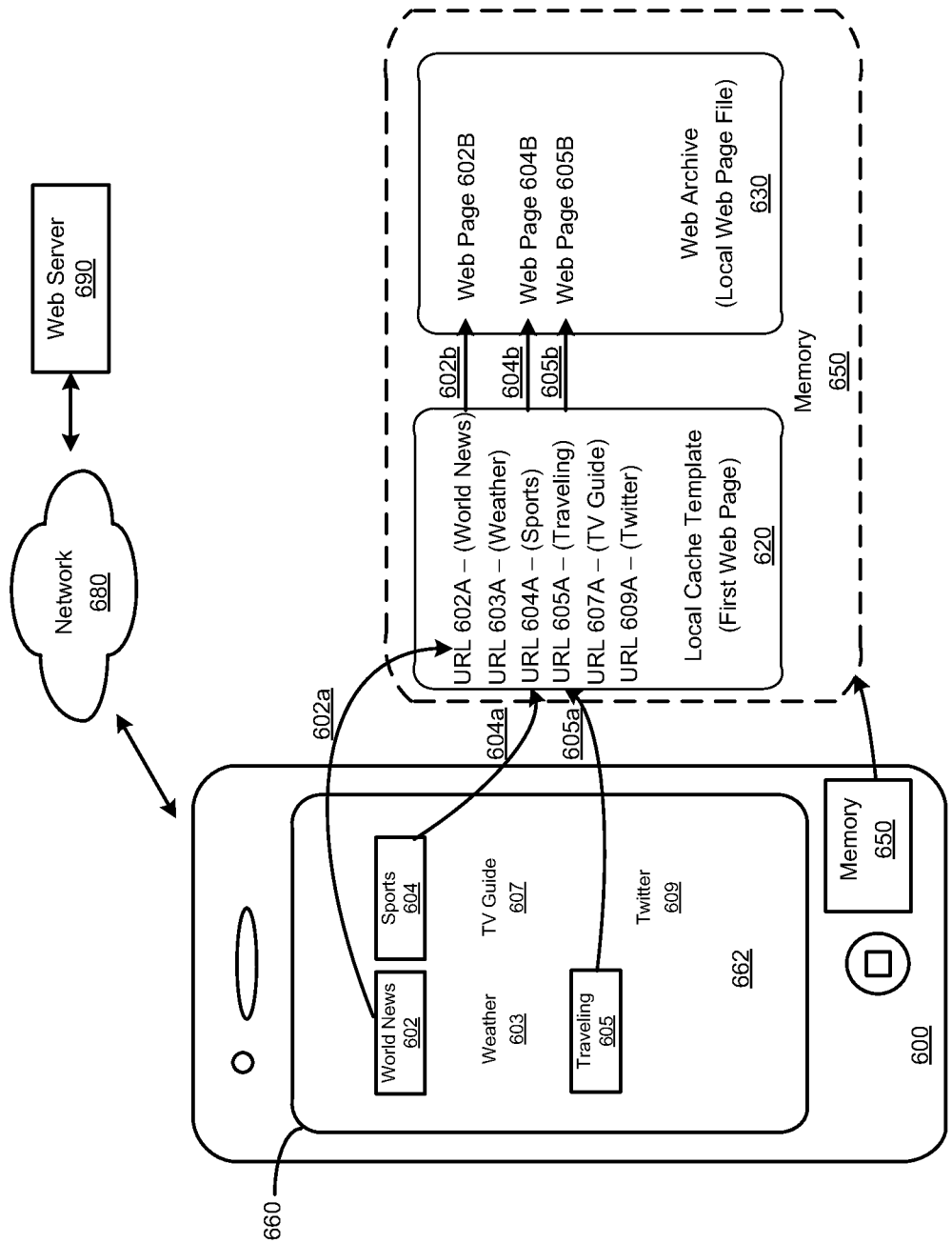
FIG. 6 illustrates an exemplary apparatus of FIG. 5 which performs offline access of web pages, according to an embodiment of the present disclosure.

FIG. 1 is an exemplary flow diagram illustrating a method for offline access of web pages, according to an embodiment of the present disclosure. To help better understand the method, a mobile terminal such as the one disclosed in FIG. 6 may be referenced to in the description. The exemplary steps of the method may include the following:

Step S101: acquiring on a user terminal (600) a local cache template (620) of a first web page (662), wherein the local cache template has pre-stored one or more respective paths (602a, 604a and 605a), each points to a respective designated Uniform Resource Locator (URL) location (602A, 604A and 605A) in the first web page, wherein each respective designated URL (602a, 604a or 605a) enables offline access to a corresponding second web page (602B, 604B or 605B) linked to the first web page.

More specifically, the first web page (662) may be the web page currently displayed in the browser (660), or the web page corresponding to the URL selected from a browser's bookmarks, a navigation bar or in the currently displayed web page. When realizing offline access of web pages, the first web page (662) serves as a root for all subsequent web pages that need to be locally cached. All subsequent web pages that need to be locally cached may be web pages that have been directly linked (i.e., second web pages linked to the first web page) or indirect linked (i.e., third web pages linked to the second web pages) to the first web page (662).

In this embodiment, the browser (660) may have pre-stored the local cache template (620) for the first web page (662); and all URLs (URLs 602A to 609A) that may be accessed offline. The locations of all the URLs (URLs 602A to 609A) in the local cache template (620) of the first web page (662) may include respective paths (602a, 604a and 605a) which correspond to the respective designated URLs (602A, 604A and 605A), which are linked to the first web page (662) and to be accessed offline as corresponding second web pages (602B, 604B and 605B). Therefore, via the paths (602a, 604a and 605a) pre-stored in the local cache template (620), it may be possible to accurately locate the corresponding second web pages (602B, 604B and 605B) structure stored in a Web Archive memory (630) which are linked to the designated URLs (602A, 604A and 605A) in the first web page (662) for offline access.

In actual realization, each web page (i.e., first web page or second web page) normally has an Extensible Markup Language (XML) file, which is used to mark up the first web page (662) in a data tree structure, so that the first web page (662) may have a structured markup language. XML Path Language (XPath) is a language that may be used to determine the location of a section of the XML file, and provides the capability to find a node in the data tree structure. In other words, XPaths may be used to point to all the respective locations of the offline access URLs (URLs 602A to 609A) of the first web page (662), and may be uniformly saved into the local cache template (620) of the first web page (662) for offline access.

In the present embodiment, the designated URLs (602A, 604A and 605A) are the URLs selected by the user as the only web pages of interests (depicted as the shaded positions 602, 604, 605) for offline access in the first web page. Alternately, the user may select the entire first web page (662) to include all the webpages (602 to 609) for offline access.

Step S102: locally caching each of the corresponding second web page, wherein each of the corresponding second web page which corresponds to a respective path pointing to the respective designated URL pre-stored in the local cache template of the first web page, such that the corresponding second web page is to be locally loaded into a browser of the user terminal when the browser accesses the respective designated URL in the first web page.

In this embodiment, the respective paths (602a, 604a and 605a) pre-stored in the local cache template (620) of the first web page (662) are visited one by one to acquire the respective designated URLs (602A, 604A and 605A) requiring offline access that are located in the corresponding positions (shaded positions 602, 604, 605) in the first web page (662) and locally cached in the Web Archive memory (630) as the corresponding second web pages (602B, 604B and 605B) for offline access.

Figure 2:
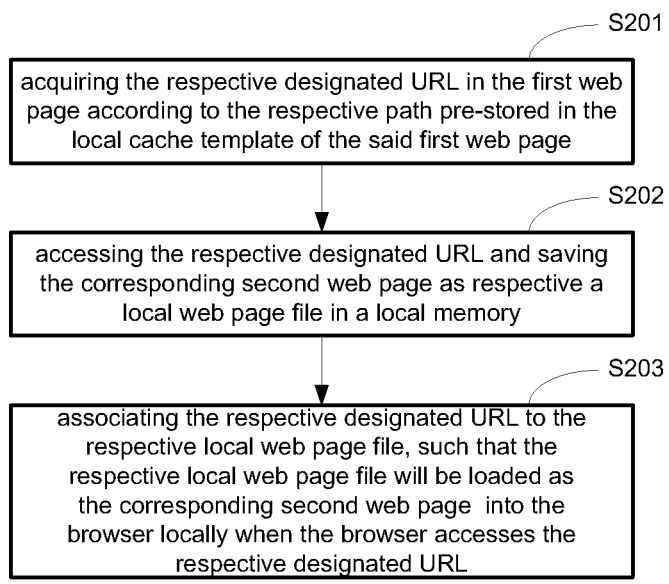
FIG. 2 is an exemplary flow diagram illustrating a step in the method of FIG. 1 in further detail for offline access of web pages, according to an embodiment of the present disclosure.

FIG. 2 is an exemplary flow diagram illustrating a step in the method of FIG. 1 in further detail for offline access of web pages, according to an embodiment of the present disclosure. More specifically, FIG. 2 illustrates the step S102, namely, the local caching of each of the corresponding second web page corresponding to the respective path pointing to the respective designated URL pre-stored in the local cache template of the first web page in further details as follows:

Step S201: acquiring the respective designated URL (602A, 604A and 605A) in the first web page (662) according to the respective paths (602a, 604a and 605a) pre-stored in the local cache template (620) of the said first web page. For example, an XPath (602a) of the first web page (662) is: /html/body/div/div[2]/h1/p/b/a, where "a" may be located in a corresponding location in a XML document in the corresponding position (602) of the first page (662). Based on the same principle, one may locate all other paths (604a, 605a) pre-stored in the local offline cache template (620), and identify and acquire all other respective designated URLs (604A, 605A) which are to be accessed offline in their corresponding positions (604, 605) in the first page (662).

Step S202: accessing the respective designated URL and saving the corresponding second web page as respective a local web page file in a local memory.

In the present embodiment, when the respective designated URL (602A) is accessed as a link to the first web page (662) in an on-line connection to a network (680), the corresponding second web page (602B) (which may be pointed to by the respective designated URL (602A)) may be downloaded from a third party web server (690) and saved into a local Web Archive memory (630) as a local web page file. The local web page file of the second web page (602B) may be opened by the browser (660) in an offline status; the second web page (602B) may be saved as a Web archive file so that when the browser (660) visits or access the respective designated URL (602A) of the second web page (602B) in future, there is no need to download any data from the web server (690), instead, the web page file of the second web page (602B) may be called and loaded locally from the Web Archive memory (630).

Step S203: associating the respective designated URL (602A, 604A or 605A) to the respective local web page file, such that the respective local web page file will be loaded as the corresponding second web page (602B, 604B 0t 605B) into the browser (660) locally when the browser accesses the respective designated URL (602A, 604A or 605A).

After the corresponding second page (602B, 604B or 605B) is saved as a local web page file, the respective designated URL (602A, 604A or 605A) may be respectively associated (see arrows 602b, 604b or 605b) locally with the local web page file, such that a user may access through the browser (660), the respective designated URL (602A, 604A or 605A) by simply the clicking a command instruction or selection command, the local web page file of the corresponding second web page (602B, 604B or 605B) may be directly loaded locally from the Web Archive memory (630), thus achieving direct offline access of the corresponding second web page (602B, 604B or 605B).

In addition, in an embodiment of the present disclosure, before the local caching is implemented in step S102, a determination may be made to the current environment of the network (680) the browser is in. For example, the browser (660) may be determined to be in an environment that the network (680) incurs no Wi-Fi network traffic fee. If so, the browser (660) may perform local caching; otherwise, the browser (660) may wait until the browser (660) may be in the Wi-Fi network environment before the browser (660) executing local caching in order to save network traffic costs.

It should be noted in the present embodiment that, the first web page (662) may function as the root for all subsequent pages (second web pages and third web pages linked to the second web pages) offline access through directly local caching utilizing steps S202 and S203, or based on a local caching method of existing web pages, which is not intended to limit the present disclosure.

Detailed descriptions on how to acquire the local cache template (620) for the first web page (662) in step S101 may be described as follows.

Downloading from a third party server (690), the local cache template (620) of the first web page (662). More specifically, a third party server (i.e., web server (690)) may be the service end of the browser (660) or the service end of the web site where the first web page (662) is in.

When the third party server (690) is the service client of the browser (660), the third party server (690) may extensively browse the access data on the client end (i.e., user terminal 600), conducting statistics and generating a local cache template (620) for some commonly used websites or web pages. When the third party server (690) is the service end of the web site where the first web page (662) is in, the service end (i.e., web server (690)) may also conduct statistics and generate a local cache template (620) for the first web page (662) based on the huge amount of user access data of the web page (662).

Accordingly, the respective designated URL (602A, 604A or 605A) may serve as the unique identifiers of the first web page (662), which respective designated URL (602A, 604A or 605A) may be downloaded from a third party server (690) to the local cache template (620) of the first web page (662). Through the local cache template (620), all the links of the corresponding second web page (602B, 604B or 605B) the user may be interested in may be saved, and at the same time, the unwanted ads links (e.g., Weather (603), TV Guide (607) and Twitter (609)) in the first web page (662) may be filtered out, thus avoiding useless information download or ineffective offline access operations.

Figure 3:
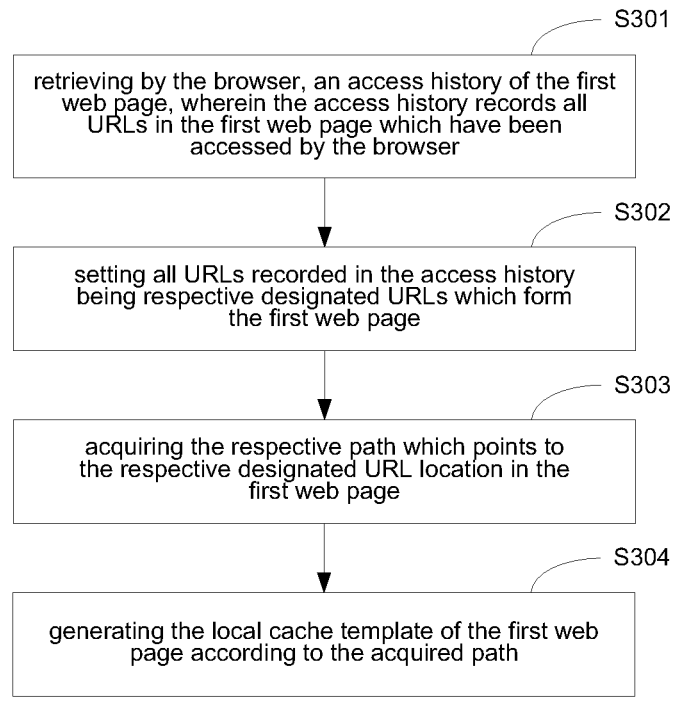
FIG. 3 is an exemplary flow diagram illustrating another method for offline access of web pages, according to an embodiment of the present disclosure.

FIG. 3 illustrates another embodiment of the present disclosure which discloses in further detail step S101 of FIG. 1, namely, the acquiring of the local cache template (620) for the first web page (662) may be locally generated in the browser (660), which may include the following steps:

Step S301: retrieving by the browser (660), an access history of the first web page (662), wherein the access history records all URLs (602A to 609A) in the first web page (662) which have been accessed by the browser (660).

By inquiring the browser (660) the access history, all the URLs (602A to 609A) in the first web page (662) the browser (660) has accessed are identified, which means the access history of the first web page (662) by the browser is retrieved.

Step S302: setting all URLs recorded in the access history being respective designated URLs which form the first web page. Certain URLs (602A, 604A and 605A) selected from the recorded URLs (602A to 609A) in the access history may be set as the designated URLs (602A, 604A and 605A) of the first web page (662), which may be offline accessed by the browser (660).

Step S303: acquiring the respective path (602a, 604a or 605a) which points to the respective designated URL (602A, 604A or 605A) location in the first web page (662). According to the location of the first page's designated URL (602A, 604A or 605A) of the first web page's XML file, the path (602a, 604a or 605a) for this location in such XML may be determined.

Step S304, generating the local cache template (620) of the first web page (662) according to the acquired path (602a, 604a or 605a). The paths (602a, 604a and 605a) acquired in step S303 are to be saved to the local cache template (620) for the first web page (620) one by one; thus, generating the local cache template 9620) which fits the browser's (660) access habit.

Furthermore, URLs (602A to 609A) in the access history may be screened in step S302. For example, only URLs (602A, 604A and 605A) which may be accessed beyond a certain threshold may be set as a designated URL (602A, 604A and 605A). This way, the accuracy of the designated URLs (602A, 604A and 605A) pointing to in the local cache template (620) may be increased, thus avoiding mistakes such as marking unwanted URLs (603A, 607A and 609A) of ads page or other websites as the designated URLs for online access just because the browser (660) may access the web page (603, 607 or 609) by mistake.

In this embodiment, by generating the local cache template (620) of the first web page (620) locally in the browser (660), the URLs (602A, 604A and 605A) pointing to the local cache template (620) may meet the browsing habit of the user. The user may further re-define or filter the local cache template generated in order to create the local cache template (620) that fits his or her browsing preference.

Further, as an embodiment of the present disclosure, other local cache templates may be embedded in the local cache template (620) of the first web page to realize simultaneous local caching of web pages in multiple tiers; hence, enhancing the efficiency of the web page local caching.

Figure 4:
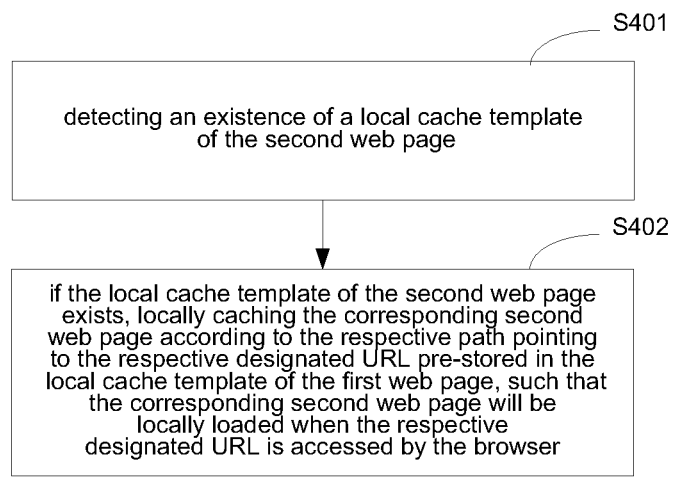
FIG. 4 is an exemplary flow diagram illustrating another method for offline access of web pages, according to an embodiment of the present disclosure.

FIG. 4 is an exemplary flow diagram illustrating another method for offline access of web pages, according to an embodiment of the present disclosure. The method include the following steps:

Step S401: detecting an existence of a local cache template of the second web page (602B, 604B or 605B). For the second web page (e.g., 602B) to correspond to the designated URL (602A) of the first web page (662), a query request may be initiated locally to the third party server (690) or a web browser (660) based on the designated URL (602A) to detect the presence of the local cache template (similar to the local cache template of the first web page, except populated with the URLs of the corresponding second web page) of the corresponding second web page (e.g., 602B).

Step 402: if the local cache template of the second web page exists, locally caching the corresponding second web page (e.g., 602B) according to the respective path pointing to the respective designated URL pre-stored in the local cache template of the first web page, such that the corresponding second web page (e.g., 602B) will be locally loaded when the respective designated URL is accessed by the browser (660).

For example, site B may be displayed as a link in the home page of web site A (i.e., second web page 602B). When offline access is made to the designated URL of the home page of web site A, offline access may also be made to the designated URL of web site B by calling its local cache template. Hence, if the browser (660) makes an offline access to web site B with links displayed in the home page of web site A (i.e., second web page 602B) after loading the home page of web site A, the browser may, after loading the home page of web site B, continue to click the links in the home page of web site B and conduct offline access to such links.

In this embodiment, the number of tiers for web page links (i.e., branching down as layers starting from the root layer of the first web page) locally cached may be a system default or defined by the user.

Furthermore, in another embodiment, the method may further include: updating the locally cached corresponding second web page (e.g., 602B) which corresponds to the respective designated URL (602A) pre-stored in the local cache template (620) of the first web page (662).

For example, if the first web page (662) is the home page of a portal site, and a designated URL (602A) of this first page is a world news page (602) for the portal, the designated URL (602A) corresponding to the world news page (602) will not change, yet its content will be updated in real time according to the world news. Therefore, timed updates or updates triggered by a command may be set up in the present embodiment to update web pages that may have been locally cached in order to ensure that the web page (602B) accessed offline by the browser (660) may be the most current or updated.

In this embodiment of the present disclosure, when the browser (660) offline accesses the first web page (662), the browser (660) may be enabled to perform local caching for the first web page's link and links (i.e., links to websites positions 602 to 609) contained in the first web page (662). This way when the browser (660) offline accesses this first web page (662), it may simultaneously offline access all the links (i.e., links to websites positions 602 to 609) contained in the first web page (662). This embodiment of the present disclosure simplifies the entire offline access process and improves the efficiency.

Figure 5:
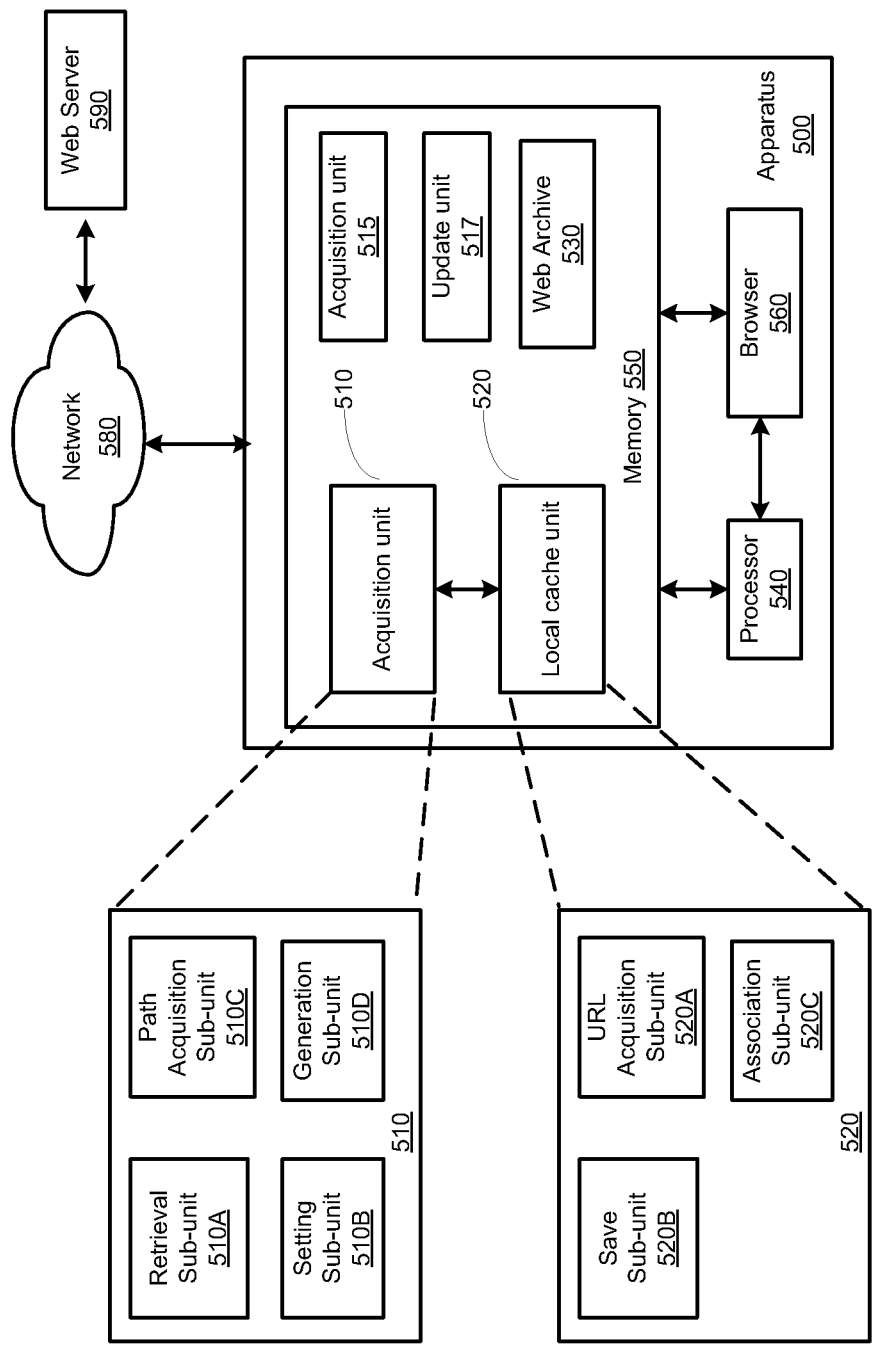
FIG. 5 illustrates an exemplary structural diagram of an apparatus which performs offline access of web pages, according to an embodiment of the present disclosure.

FIG. 5 illustrates an exemplary structural diagram of an apparatus (500) which performs offline access of web pages, according to an embodiment of the present disclosure. To facilitate the description, only the sections related to this embodiment are illustrated.

As shown in FIG. 5, the apparatus (500) may include: at least a processor (540) operating in conjunction with at least a memory (550) which stores instruction codes operable as plurality of units (510, 520), wherein the plurality of units may include:

An acquisition unit (510), which acquires a local cache template (620) of a first web page (662), wherein the local cache template (620) has pre-stored one or more respective paths (602a, 604a and 605a), each points to a respective designated Uniform Resource Locator (URL) (602A, 604A and 605A) location in the first web page (662), wherein each respective designated URL (602A, 604A or 605A) enables offline access to a corresponding second web page (602B, 604B or 605B) linked to the first web page (662).

A local cache unit (520), which locally caches each of the corresponding second web page (602B, 604B or 605B), wherein each of the corresponding second web page (602B, 604B or 605B) which corresponds to a respective path (602a, 604a and 605a) pointing to the respective designated URL (602A, 604A or 605A) pre-stored in the local cache template (620) of the first web page (662), such that the corresponding second web page (602B, 604B or 605B) is to be locally loaded into a browser (560 or 660) of the user terminal (500) when the browser (560) accesses the respective designated URL (602A, 604A or 605A) in the first web page (662).

Optionally, the acquisition unit (510) is specifically configured to download from a third party server (590) the local cache template (620) of the first web page (662).

Optionally, the acquisition unit (510) may include:
A retrieval sub-unit (510A) which retrieves an access history of the first web page (662), wherein the access history records all URLs (602A to 609A) in the first web page (662) which have been accessed by the browser (560 or 660).

A setting sub-unit (510B), which sets specific URLs recorded in the access history being respective designated URLs (602A, 604A, 605A) which form the first web page (662).

A path acquisition sub-unit (510C), which acquires the respective path (602a, 604a, 605a) which points to the respective designated URL (602A, 604A, 605A) location in the first web page (662).

A generation sub-unit (510D), which generates the local cache template (620) of the first web page (662) according to the acquired path (602a, 604a, 605a).

Optionally, the local cache unit (520) includes:

A URL acquisition sub-unit (520A), which acquires the respective designated URL (602A, 604A or 605A) in the first web page (662) according to the respective path (602a, 604a or 605A) pre-stored in the local cache template (620) of the first web page (662);

A save sub-unit (520B), which accesses the respective designated URL (602A, 604A or 605A) and saving the corresponding second web page (602B, 604B or 605B) as respective local web page file in a local memory (i.e., Web Archive memory (530) or (630)).

An association sub-unit (520C), which associates the respective designated URL (602A, 604A or 605A) to the respective local web page file, such that the corresponding second web page (602B, 604B or 605B) which corresponds to the respective local web page file will be loaded into the browser (660) locally, when the browser (660) accesses the respective designated URL (602A, 604A or 605A).

Optionally, the apparatus (500) also includes:

A detection unit (515) which detects an existence of a local cache template of the second web page (602B, 604B or 605B). If the local cache template of the second web page exists, locally caching the corresponding second web page according to the respective path pointing to the respective designated URL pre-stored in the local cache template of the first web page, such that the corresponding second web page (602B, 604B or 605B) will be locally loaded when the respective designated URL is accessed by the browser (560 or 660).

Optionally, the apparatus (500) also includes:

An update unit (517), which updates the locally cached corresponding second web page which corresponds to the respective designated URL pre-stored in the local cache template of the first web page.

This embodiment of the present disclosure illustrates that the browser (560 or 660) may locally cache the links (602 to 609) for a first web page (662) as well as links contained in the second web page (602B, 604B or 605B) when performing offline access to a web page. This way when the browser offline accesses this page, it can offline access the web page links contained in this page. The embodiment of the present disclosure simplifies the process for web page offline access and improves the operational efficiency.

The steps in the various methods in the aforementioned embodiments may be completed via programs, which command corresponding hardware. Such programs may be stored in a non-transitory computer-readable memory medium. The non-transitory computer-readable memory medium may include: flash memory disk, read-only memory (ROM), random access memory (RAM), disk or compact disk, etc.

Disclosed above are only preferred embodiments of the present disclosure and these preferred embodiments are not intended to be limiting the scope of rights of the present disclosure, hence any equivalent changes made according to the claims of the present disclosure shall fall within the scope of the present disclosure.

What is claimed is:

1. A method for offline access of web pages, comprising:
   acquiring on a user terminal a local cache template of a first web page, wherein the local cache template has pre-stored one or more respective paths, each points to a respective designated Uniform Resource Locator (URL) location in the first web page, wherein each respective designated URL enables offline access to a corresponding second web page linked to the first web page;
   locally caching each of the corresponding second web page, wherein each of the corresponding second web page which corresponds to a respective path pointing to the respective designated URL in the first web page having been pre-stored in the local cache template of the first web page, such that the corresponding second web page is to be locally loaded into a browser of the user terminal when the browser accesses the respective designated URL in the first web page;
   wherein the local caching of each of the corresponding second web page corresponding to the respective path pointing to the respective designated URL in the first web page having been pre-stored in the local cache template of the first web page, further comprising:
   acquiring the respective designated URL in the first web page according to the respective path pre-stored in the local cache template of the first web page;
   accessing the respective designated URL and saving the corresponding second web page as respective a local web page file in a local memory; and
   associating the respective designated URL to the respective local web page file, such that the corresponding second web page which corresponds to the respective local web page file for the first web page will be loaded as the corresponding second web page into the browser locally when the browser accesses the respective designated URL of the first web page for a subsequent offline access to contents of respective URL links to the corresponding second web page, wherein the display of the second webpage is caused by a prior access to the respective designated URL link in the first web page.

2. The method according to claim 1, wherein the acquiring of the local cache template for the first web page comprising:
   downloading from a third party server, the local cache template of the first web page.

3. The method according to claim 1, wherein the acquiring of the local cache template for the first web page comprising:
   retrieving by the browser, an access history of the first web page, wherein the access history records all URLs in the first web page which have been accessed by the browser;
   setting specific URLs recorded in the access history being respective designated URLs which form the first web page;
   acquiring the respective path which points to the respective designated URL location in the first web page; and
   generating the local cache template of the first web page according to the acquired path.

4. The method according to claim 1, comprising detecting an existence of a local cache template of the second web page;

if the local cache template of the second web page exists, locally caching the corresponding second web page according to the respective path pointing to the respective designated URL pre-stored in the local cache template of the first web page, such that the corresponding second web page will be locally loaded when the respective designated URL is accessed by the browser.

5. The method according to claim 1, comprising updating the locally cached corresponding second web page which corresponds to the respective designated URL pre-stored in the local cache template of the first web page.

6. An offline web page accessing apparatus, comprises at least a processor operating in conjunction with at least a memory which stores instruction codes operable as plurality of units, wherein the plurality of units comprise:
an acquisition unit, which acquires a local cache template of a first web page, wherein the local cache template has pre-stored one or more respective paths, each points to a respective designated Uniform Resource Locator (URL) location in the first web page, wherein each respective designated URL enables offline access to a corresponding second web page linked to the first web page;
a local cache unit, which locally caches each of the corresponding second web page, wherein each of the corresponding second web page which corresponds to a respective path pointing to the respective designated URL pre-stored in the local cache template of the first web page, such that the corresponding second web page is to be locally loaded into a browser of the user terminal when the browser accesses the respective designated URL in the first web page;
wherein the local cache unit comprises:
a URL acquisition sub-unit, which acquires the respective designated URL in the first web page according to the respective path pre-stored in the local cache template of the said first web page;
a save sub-unit, which accesses the respective designated URL and saving the corresponding second web page as respective a local web page file in a local memory; and
an association sub-unit, which associates the respective designated URL in the first web page to the respective local web page file, such that the corresponding second web page which corresponds to the respective local web page file for the first web page will be loaded as the corresponding second web page into the browser locally when the browser accesses the respective designated URL of the first web page for a subsequent offline access to contents of respective URL links to the corresponding second web page, wherein the display of the second webpage is caused by a prior access to the respective designated URL link in the first web page.

7. The apparatus according to claim 6, wherein the acquisition unit downloads from a third party server, the local cache template of the first web page.

8. The apparatus according to claim 6, wherein the said acquisition unit comprises:
a retrieval sub-unit, which retrieves an access history of the first web page, wherein the access history records all URLs in the first web page which have been accessed by the browser;
a setting sub-unit, which sets specific URLs recorded in the access history being respective designated URLs which form the first web page;
a path acquisition sub-unit, which acquires the respective path which points to the respective designated URL location in the first web page; and
a generation sub-unit, which generates the local cache template of the first web page according to the acquired path.

9. The apparatus according to claim 6, further comprises:
a detection unit, which detects an existence of a local cache template of the second web page;
if the local cache template of the second web page exists, locally caching the corresponding second web page according to the respective path pointing to the respective designated URL pre-stored in the local cache template of the first web page, such that the corresponding second web page will be locally loaded when the respective designated URL is accessed by the browser.

10. The apparatus according to claim 6, further comprises:
an update unit, which updates the locally cached corresponding second web page which corresponds to the respective designated URL pre-stored in the local cache template of the first web page.

11. A non-transitory computer-readable medium having stored thereon, a computer program having at least one code section being executable by a user terminal which causes the mobile terminal to perform steps for offline access to a web page by a browser, comprising:
acquiring on a user terminal a local cache template of a first web page, wherein the local cache template has pre-stored one or more respective paths, each points to a respective designated Uniform Resource Locator (URL) location in the first web page, wherein each respective designated URL enables offline access to a corresponding second web page linked to the first web page;
locally caching each of the corresponding second web page, wherein each of the corresponding second web page which corresponds to a respective path pointing to the respective designated URL pre-stored in the local cache template of the first web page, such that the corresponding second web page is to be locally loaded into a browser of the user terminal when the browser accesses the respective designated URL in the first web page;
wherein the local caching of each of the corresponding second web page corresponding to the respective path pointing to the respective designated URL pre-stored in the local cache template of the first web page, comprising:
acquiring the respective designated URL in the first web page according to the respective path pre-stored in the local cache template of the first web page;
accessing the respective designated URL and saving the corresponding second web page as respective a local web page file in a local memory; and
associating the respective designated URL to the respective local web page file, such that the corresponding second web page which corresponds to the respective local web page file for the first web page will be loaded as the corresponding second web page into the browser locally when the browser accesses the respective designated URL of the first web page for a subsequent offline access to contents of respective URL links to the corresponding second web page, wherein the display of the second webpage is caused by a prior access to the respective designated URL link in the first web page.

12. The non-transitory computer-readable medium according to claim 11, wherein the acquiring of the local cache template for the first web page comprising:

downloading from a third party server, the local cache template of the first web page.

13. The non-transitory computer-readable medium according to claim 11, wherein the acquiring of the local cache template for the first web page comprising:

retrieving by the browser, an access history of the first web page, wherein the access history records all URLs in the first web page which have been accessed by the browser;

setting specific URLs recorded in the access history being respective designated URLs which form the first web page;

acquiring the respective path which points to the respective designated URL location in the first web page; and generating the local cache template of the first web page according to the acquired path.

14. The non-transitory computer-readable medium according to claim 11, comprising detecting an existence of a local cache template of the second web page;

if the local cache template of the second web page exists, locally caching the corresponding second web page according to the respective path pointing to the respective designated URL pre-stored in the local cache template of the first web page, such that the corresponding second web page will be locally loaded when the respective designated URL is accessed by the browser.

15. The non-transitory computer-readable medium according to claim 11, comprising updating the locally cached corresponding second web page which corresponds to the respective designated URL pre-stored in the local cache template of the first web page.

\* \* \* \* \*

UNITED STATES PATENT AND TRADEMARK OFFICE
CERTIFICATE OF CORRECTION

PATENT NO. : 9,571,601 B2
APPLICATION NO. : 14/281293
DATED : February 14, 2017
INVENTOR(S) : Ningjun Dou It is certified that error appears in the above-identified patent and that said Letters Patent is hereby corrected as shown below:

On the Title Page

Left column, item (73), replace "TENCENT TECHNOLOGY (SHNZHEN) CO., LTD.," with --TENCENT TECHNOLOGY (SHENZHEN) COMPANY LIMITED--.

Signed and Sealed this
Twenty-eighth Day of May, 2019

Andrei Iancu
*Director of the United States Patent and Trademark Office*